3,754,040
STERILIZED GLYCERYL GUAIACOLATE POWDER
AND PROCESS FOR MANUFACTURING SAME
Raymond L. Moore, Plainfield, N.J., assignor to
Summit Hill Laboratories, Summit, N.J.
No Drawing. Filed Jan. 9, 1970, Ser. No. 1,866
Int. Cl. A61l 1/00; C07c 43/20
U.S. Cl. 260—613 D
8 Claims

ABSTRACT OF THE DISCLOSURE

Glyceryl guaiacolate in powdered form is rendered sterile by treatment with ethylene oxide with the aid of heat but at a temperature below its melting point, and thereby made safe for administration to lower animals and to human beings.

---

The present invention relates to the preparation of glyceryl guaiacolate powder in a sterile condition ready for immediate veterinary and human use, as by intravenous administration when dissolved in U.S.P. sterile water or sterile dextrose solution or other liquid suitable for injection.

Glyceryl guaiacolate powder is useful as a muscle relaxant and anesthetic in animal surgery and in the sterile powdered form provided by the present invention can safely be employed for the same purposes in human surgery. It is useful also in cough syrups and other antitussive products. Glyceryl guaiacolate has been employed in veterinary practice in the form and condition available commercially as bulk material, but so far as I am aware there has heretofore been no investigation of possible contamination of the powder by harmful microorganisms.

I have found that glyceryl guaiacolate powder as presently available is in the form of an industrial product and is not sterile, but is contaminated with bacteria, molds and other microorganisms. However, the compound cannot be rendered sterile by the usual heat-sterilization because of the danger of alteration or decomposition of the material in view of its low melting point (80–82° C.).

My investigations have shown that glyceryl guaiacolate powder can be safely sterilized by treatment with ethylene oxide, preferably at an elevated temperature but considerably below its melting point, the powder being exposed to the action of the oxide, for example, in the form of layers of about ½ to 1¼ inches in thickness, a thickness of about ¾ inch being generally preferred. By this treatment, all microorganisms are destroyed without in any way affecting the composition or potency of the compound. In such sterilized form, the powdered compound is safe for the treatment also of human beings even by the parenteral routes.

To establish whether glyceryl guaiacolate as purchased on the open market was sterile or in the contrary was contaminated with microorganisms such as bacteria, molds, etc., portions of bulk glyceryl guaiacolate as purchased on the open market were subjected to sterility testing by using thioglycollate, Sabouraud, and trypticase soy nutrient media. Growth was noted on all of the media, indicating contamination of the commercial glyceryl guaiacolate.

The effectiveness of the ethylene oxide treatment was established by the following tests:

The glyceryl guaiacolate powder was purchased on the open market, and was deliberately additionally contaminated with pathogens known to be difficult to destroy. Accordingly, there was added to four petri dishes containing sterile trypticase soy agar a 1.0 gram sample of the commercial glyceryl guaiacolate. This was repeated using nutrient agar. Approximately 1.0 ml. of a 24-hour culture of Staphylococcus aureus was aseptically pipetted directly onto the glyceryl guaiacolate powder in two of the trypticase soy agar dishes and two of the nutrient agar dishes, and was intimately mixed with the S. aureus with a platinum loop. This last step was repeated on other portions of the guaiacolate but using a 24-hour culture of B. subtilis.

There were thus prepared petri dishes containing the following:

2 each: Trypticase Soy Agar+glyceryl guaiacolate powder+S. aureus.
2 each: Trypticase Soy Agar+glyceryl guaiacolate powder+B. Subtilis.
2 each: Nutrient Agar+glyceryl guaiacolate powder+S. aureus.
2 each: Nutrient Agar+glyceryl guaiacolate+S. aureus.

One of each of the 4 sets of petri dishes above described was subjected to a 6-hour ethylene oxide sterilization cycle, while a duplicate set consisting of 1 of each of the 4 sets served as a control.

The control plates were incubated at 30–32° C. along with the plates which were exposed to the ethylene oxide treatment.

The results were as follows:
(A) Growth was observed in the control plates which had not been exposed to ethylene oxide.
(B) No growth was observed in the duplicate plates exposed to ethylene oxide.

Assaying of the sterilized powder showed no loss of potency, from the gas sterilization. Also, the sterilization did not alter the solubility of the compound in water or its moisture content.

The method of manufacturing the sterile glyceryl guaiacolate powder of the present invention employing the contaminated commercially obtained ester was preferably conducted as follows:

A quantity (1–20 lbs.) of glyceryl guaiacolate powder was placed in double polyethylene bags and spread out therein in thin layers of about ½ inch to 1¼ inches thick which will allow penetration by the ethylene oxide and adequate degree of heat transfer. The inner and outer bags were then tied securely after being flattened to minimize the volume of residual air. The bags, on individual perforated trays, were then placed in an ethylene oxide sterilizing chamber, after which the chamber door was closed and tightly sealed.

The chamber was provided with a heat exchanger containing a body of water and steam was then charged into it to raise the temperature to approximately 160° F. (71° C.). The chamber was connected to a vacuum pump and the latter was then operated to pull the vacuum to 26 inches. Steam was then introduced into the chamber until the degree of vacuum was reduced to 24 inches and the chamber held thereat for one hour. A mixture of ethylene oxide and Freon 12 (12:88) was then introduced from a pressure cylinder until the pressure in the chamber was 7 lbs. gauge, and held for 6 hours. The vacuum was then pulled to 24 inches. Air filtered through millipores of about 0.45 micron was then admitted, and the degree of vacuum finally pulled to 24 inches. Filtered air was then again admitted (through millipores of about 0.45 micron) to atmospheric pressure. The trays were then removed from the chamber and the bags emptied under aseptic conditions.

The ethylene oxide is employed in admixture with a neutral gas, as indicated above. A suitable gas mixture is composed of 12% ethylene oxide and 88% Freon 12. In place of the Freon 12 there can be employed carbon dioxide (as in the ratio of 10 parts ethylene oxide to 90 parts carbon dioxide, by volume), nitrogen, and other non-reactive diluent gases.

The glyceryl guaiacolate powder can also be sterilized in plastic bottles or other containers whose walls are porous to ethylene oxide and its diluent gas but are nonporous to microorganisms. Polyethylene bottles are suitable for this purpose and may be the containers in which the powder is marketed. As stated above, the sterilization treatment does not alter the moisture content of the powder even though it is heated with steam, the plastic (e.g. polyethylene) bags and bottles being impervious to the steam, despite its elevated temperature and despite the fact that the ethylene oxide itself passes through the plastic film or wall, so that the original powder retains its powdery condition.

The sterilized glyceryl guaiacolate powder is marketed in the known forms for veterinary use as in the form of tablets or in ampoules and because of its sterile character, can be employed also for the treatment of human beings. For use in animal and human surgery, a 4% and up to an approximately saturated solution (at body temperature), which may be as much as 20% with or without additional drugs such as barbiturates, is injected intravenously to produce muscle relaxation and, in the higher dosages, also anesthesia. The tablets can be composed of the sterile powder mixed with soluble excipients, such as sterile sugars and salt, while the ampoules can contain the sterile powder itself or a solution thereof in sterile water or saline. The powder can also be incorporated in suppositories containing the usual unguents in which the powder content may be 10% to 50% or even higher, or in cough syrups for producing a sterile product for oral use.

I claim:

1. The method of sterilizing glyceryl guaiacolate powder while retaining its powdery condition, which comprises subjecting the powder to the action of moisture-free-ethylene oxide gas at an elevated temperature but sufficiently below 176° F. to prevent fusion or caking of the powder, and continuing the treatment until complete sterility is attained.

2. The method according to claim 1, wherein the powder is distributed in layers which are from about ½ to 1¼ inches thick in sealed plastic bags porous to the ethylene oxide but non-porous to microorganisms.

3. The method according to claim 1, wherein the treatment is conducted at a temperature of approximately 160° F.

4. The method according to claim 1, wherein the powder is distributed in sealed polyethylene bags which are placed on perforated trays, charging the trays into a sterilization chamber, sealing the chamber, heating the interior thereof to about 160° F. by charging steam thereinto, establishing a partial vacuum therein, charging ethylene oxide mixed with a diluent gas into the chamber until the pressure therein is above atmospheric, again establishing a vacuum in the chamber, and then admitting filtered air into the chamber, the polyethylene being pervious to the ethylene oxide but being impervious to the steam and to microorganisms.

5. The product of the process of claim 1, comprising sterile powdered glyceryl guaiacolate, capable of safe parenteral injection on mixing with sterile water.

6. The method according to claim 1 wherein the powder is contained in a sealed plastic container which is heated externally with the aid of steam, the plastic containers being impervious to the steam and to microorganisms but being porous to the ethylene oxide.

7. The method according to claim 6 wherein the plastic is polyethylene.

8. The product of the process of claim 7 contained in the sealed polyethylene bottle porous to ethylene oxide but non-porous to microorganisms and to moisture and in which the powder was sterilized.

References Cited

UNITED STATES PATENTS

| 3,109,773 | 11/1963 | Mercer | 260—613 D X |
| 3,320,254 | 5/1967 | Carissimi | 260—613 D X |
| 3,354,227 | 11/1967 | Katzschmann | 260—613 D |
| 3,374,276 | 3/1968 | Swidinsky | 260—613 D |
| 2,189,948 | 2/1940 | Griffith | 21—Dig. 4 |
| 3,093,242 | 6/1963 | Huyck | 21—Dig. 4 |

FOREIGN PATENTS

| 488,418 | 7/1938 | Great Britain. |
| 1,148,704 | 5/1963 | Germany. |

OTHER REFERENCES

"The Dispensatory of the United States," 1960 edition, 629–30, Osol et al., eds., J. B. Lippincott Co., Phila.

"The Merck Index," 500, Merck & Co., Rahway, N.J., 1960.

MORRIS O. WOLK, Primary Examiner

S. MARANTZ, Assistant Examiner

U.S. Cl. X.R.

21—Dig. 4, 58; 424—341; 215—1C